Sept. 11, 1945.　　　S. APOSTOLESCU　　　2,384,445

HELICOPTER

Filed Jan. 25, 1943　　　2 Sheets-Sheet 1

INVENTOR.
Stefan Apostolescu
BY
　　　　　ATTORNEY

Sept. 11, 1945.     S. APOSTOLESCU     2,384,445
HELICOPTER
Filed Jan. 25, 1943     2 Sheets-Sheet 2

INVENTOR.
Stefan Apostolescu
BY
ATTORNEY

Patented Sept. 11, 1945

2,384,445

UNITED STATES PATENT OFFICE 2,384,445

HELICOPTER

Stefan Apostolescu, New York, N. Y.

Application January 25, 1943, Serial No. 473,461

2 Claims. (Cl. 244—17)

This invention relates to new and useful improvements in a helicopter.

More specifically, the invention proposes the construction of an airplane characterized by a stream-lined body provided with helicopter rotors each of which includes a rotative drum carrying a plurality of helicopter blades and a means for rotating the drums forming the required lifting force for getting the device into the air.

Still further it is proposed to pivotally mount each of the helicopter blades upon its respective drum and provide a means for pivoting the blades in a manner to increase and decrease the lifting power of the helicopter rotors in accordance with the weight being carried.

A further object of the invention proposes the provision of disc-like cams within the drums of the helicopter rotors for turning the blades as the drums are rotated in a manner to vary their pitch for producing a forward thrust when desired.

It is a further object of this invention to construct a helicopter rotor which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
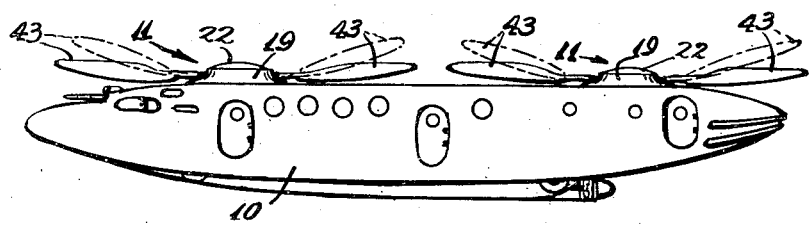
Fig. 1 is a side elevational view of a helicopter constructed in accordance with this invention.
Figure 2:
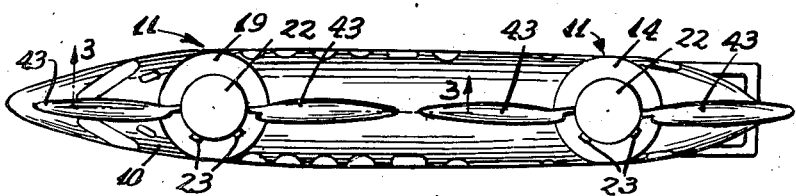
Fig. 2 is a plan view of Fig. 1.
Figure 3:
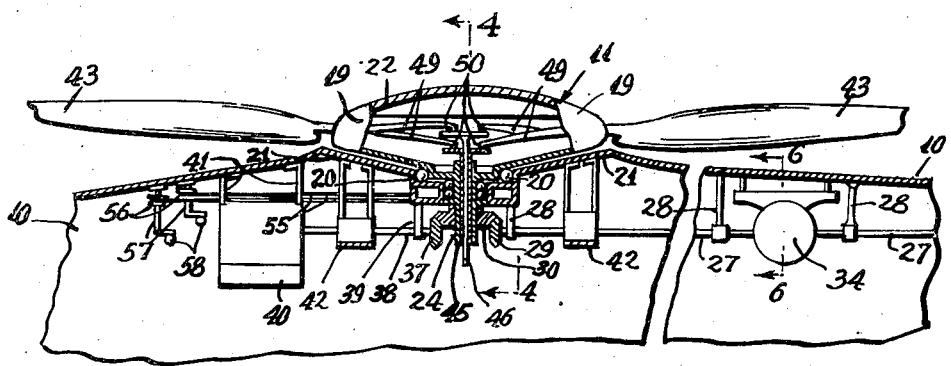
Fig. 3 is a partial vertical sectional view taken substantially on the line 3—3 of Fig. 2.
Figure 4:
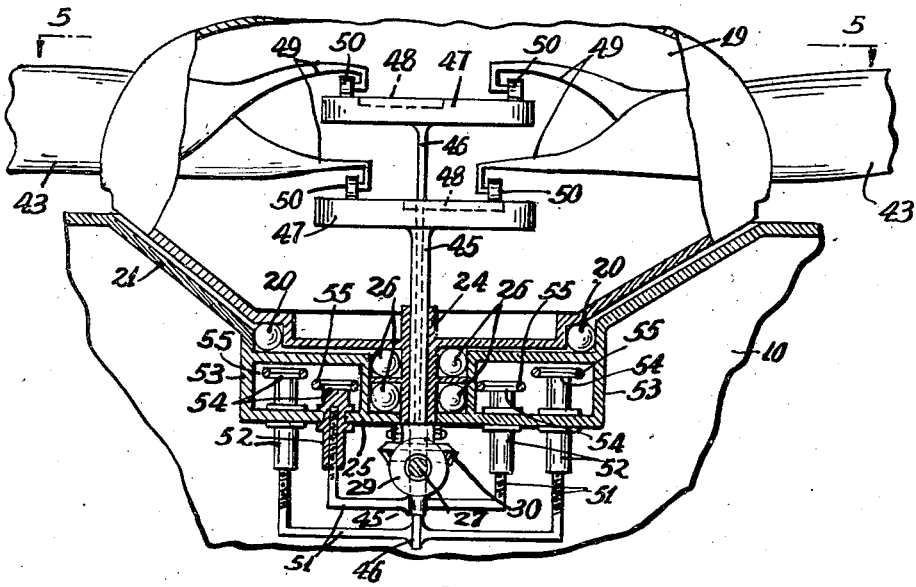
Fig. 4 is a vertical sectional view taken substantially on the line 4—4 of Fig. 3.

The helicopter, according to this invention, includes a stream-lined body 10 provided with a plurality of helicopters 11.

Each of the helicopter rotors 11 is alike in construction and each comprises a hollow drum 19 rotatively resting upon bearings 20 mounted in a depression 21 formed on the top wall of the stream-lined body 10. A compartment is formed upon the top of the hollow drum 19 by pivotally supporting a dome-shaped wall 22 upon the drum 19 by means of hinges 23. Parachutes are adapted to be stored within the compartment formed by the dome-shaped wall 22 and a means not shown on the drawings is provided for opening the dome-shaped wall 22 to free the parachutes in case of an emergency to safely lower the airplane to the ground.

A vertical hollow shaft 24 extends from the hollow drum 19 and projects through a supporting bushing 25 formed in the depression 21 of the stream-lined body 10. Ball bearings 26 are located between the adjacent faces of the hollow shaft 24 and the tubular bushing 25 so that the hollow shaft 24 will be free to rotate.

Means is provided for rotating the drums 19 of each of the helicopter rotors 11. This means is characterized by horizontal shafts 27 which are rotatively supported in end alignment in bearings 28 mounted within the stream-lined body 10. The outer ends of the shafts 27 carry bevel gears 29 which mesh with bevel gears 30 mounted upon the bottom end of the hollow shafts 24 of the hollow drums 19. The inner ends of the shafts 27 carry bevel gears 31 which mesh with spaced bevel gears 32 mounted upon shafts 33 which extend from motors 34. The motors 34 are supported upon brackets 35 which are attached to the ceiling of the stream-lined body 10. The shafts 33 of the motors 34 extend towards each other and one has a reduced section 36 engaging freely into a complementary opening formed in the other so that each acts as a bearing for the other. The motors 34 are designed to rotate their shafts 33 in opposite directions so that the bevel gears 31 may mesh and be driven by each of the bevel gears 32.

Bevel gears 37 mesh with opposite sides of the bevel gears 30 and are mounted on shafts 38. The shafts 38 are rotatively supported in bearings 39 attached to the ceiling of the stream-lined body 10. The outer ends of the shafts 38 connect with motors 40 supported in brackets 41 also attached to the ceiling of the stream-lined body 10.

Manually operable clutches 42 are mounted in the shafts 27 and 38 intermediate of their ends and are provided for the purpose of causing the hollow drums 19 to be driven by the motors 34 or the motors 40. More specifically, as the clutches 42 on the shafts 27 are closed, while the clutches 42 on the shafts 38 are open, the hollow drums 19 will be driven by the motors 34. However, in the event something goes wrong with either of the motors 34, or if it should become desirable to drive the hollow drums 19 by the motors 40 for any other reason, it is merely necessary to open the clutches 42 on the shafts 27 and close the clutches 42 on the shafts 38. The bevel gears 30 of the hollow drums 19 will be now connected with the motors 40 to be driven independently.

Helicopter blades 43 are projected radially from the hollow drums 19 and are turnably and rotatively supported thereon. More specifically, each helicopter blade is normally supported through a bearing (not illustrated on the drawings) mounted on the walls of the hollowed bodies 19. The bearings permit the blades 43 to be pivoted vertically and at the same time permit them to be turned slightly about their longitudinal axes.

Figure 5:
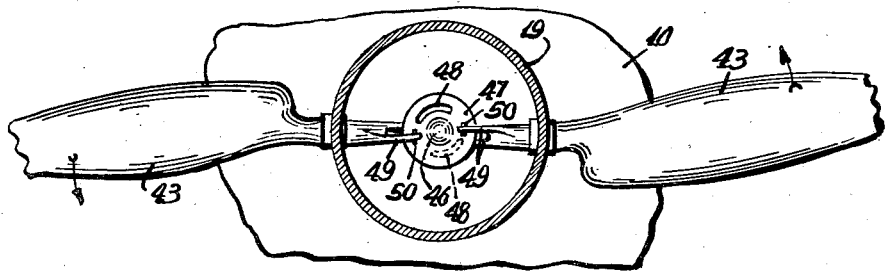
Fig. 5 is a horizontal sectional view taken on the line 5—5 of Fig. 4.
Figure 6:
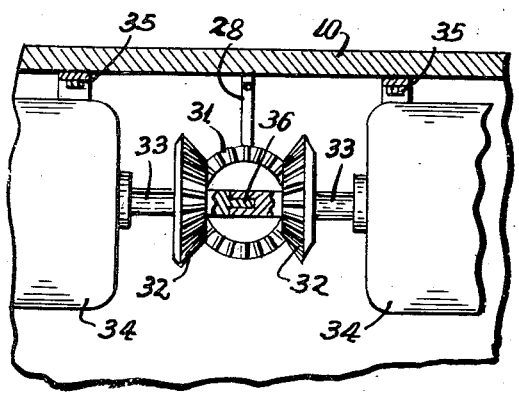
Fig. 6 is a sectional view taken substantially on the line 6—6 of Fig. 3.

A tubular rod 45 is vertically slidably extended through the tubular shaft 34 and a solid rod 46 is concentrically extended through the tubular rod 45. Vertically spaced horizontal disc-like cams 47 are mounted upon the top ends of the rods 45 and 46 within the hollow drums 19. The rods 45 and 46 are retained against rotating as will be hereinafter described, permitting the hollow drums 19 to rotate freely thereabout so that the inner end of the radial helicopter blades 43 will move in a circular path adjacent the peripheral edges of the disc-like cams 47. As shown in Fig. 5 each of the disc-like cams 47 is formed with a recessed cam surface 48. The cam surfaces of each of the disc-like cams 47 are arranged diametrically opposite each other and the inner end of each of the helicopter blades 43 is formed with an inwardly directed arm 49 for each of the disc-like cams 47. The arms of each of the helicopter blades 43 are arranged substantially superimposed one on the other and has its free inner end disposed above the cam-like recess 48. The inner end of the arms 49 are provided with rollers 50 disposed to roll on the top face of the cam 47 and engage the cam-like recesses 48 for the purpose of causing the inner end of the radial helicopter blades 43 to be moved to mimic the shape of the recessed cams 48. It will thus be understood that if one of the cam recesses 48 of one of the cam-like discs 47 is formed with a slight depression, as shown in Fig. 5, it will cause its respective arm 49 to be moved downwards, but if the disc engaged by one other arm of the particular helicopter blade is not formed with a depression, the depression will cause a slight twisting or turning in the helicopter blade 43 as permitted by the thrust bearing 44 to vary the pitch angle of the blades, producing a forward thrust when desired.

Means is provided for holding the rods 45 and 46 against turning, as previously mentioned, and for permitting the rods to be selectively raised for pivoting the blades 43 about the thrust bearing 44. This means comprises L-shaped arms 51 which have one set of arms attached to the bottom ends of the rods 45 and 46 and which are extended in opposite directions from the rods 45 and 46. The L-shaped arms 51 have another set of arms directed vertically upwards and threadedly extended into rotatively supported bushings 52. These bushings 52 are rotatively supported on brackets 53 extended between the tubular portions 25 and the ceiling of the stream-lined body 10. The engagement of the arms of the L-shaped members 51 with the bushings 52 will retain the rods 45 and 46 against turning.

Means is also provided for turning the bushings 52 to cause the threadedly engaged portions of the bushings 42 and the L-shaped arms 51 to move relative to each other to move the rods 45 and 46 vertically upwards and downwards for pivoting the helicopter blades 43. This means comprises pulleys 54 mounted on the top end of the bushings 52 and over which belts 55 are extended. Opposite areas of the belts 55 are engaged over similar pulleys 56 mounted on rotatively supported shafts 57. The shafts 57 are rotatively supported upon the ceiling of the stream-lined body 10 and are provided at their bottom ends with handles 58 by which they may be turned for in turn rotating the bushings 52, causing the L-shaped arms 51 to move upwards or downwards, depending upon the direction in which the bushings have been turned.

The bushings 52 must all be rotated as a unit causing the rods 45 and 46 to move upwards and downwards together.

The operation of this device is as follows:

Normally, the helicopter rotors 11 are adapted to be driven by the motors 34 in their arcuate path for producing a forward thrust to lift the stream-lined body 10 substantially vertically upwards and propel the same forwardly through the air after it has attained a desired flying height. As the helicopter blades 43 are rotated by the rotative motion of the hollow drums 19 the movement of the blades 43 about the disc-like cams 47 will cause the blades 43 to be twisted slightly by depressions in the cam recesses 50 to twist the blades slightly when desired on the rearward motion of the blade to increase the forward thrust of the helicopter. If it is found that the load carried by the stream-lined body is so great that the normal position of the helicopter blades 43 are insufficient to produce the desired lift to get the stream-lined body off the ground, it is possible to adjust the angular portion of the blades 43 to increase their lifting capacity. This is accomplished by moving the rods 45 and 46 either vertically upwards or downwards, depending whether the blades to be raised or lowered, and this is accomplished by rotating the shafts 57 through the medium of the handles 58.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a helicopter, a body, a hollow drum rotatively supported on said body to turn on a vertical axis, blades projecting radially from said drum and mounted through the sides of said drum to turn about their longitudinal axes and pivot in a vertical plane, a pair of substantially superimposed arms mounted on the inner end of each of said blades, a pair of concentric rods extending into said drum and being vertically slidable but not rotative, a pair of vertically spaced horizontal disc-like cams mounted on said rods and engaging said arms for turning said blades to vary their pitch for producing a forward thrust when desired, and means for raising and lowering said rods relative to each other to turn said blades on their longitudinal axes or for raising and lowering said rods in unison to pivot said blades about transverse axes.

2. In a helicopter, a body, a hollow drum rotatively supported on said body to turn on a vertical axis, blades projecting radially from said drum and mounted through the sides of said drum to turn about their longitudinal axes and pivot in a vertical plane, a pair of substantially superimposed arms mounted on the inner end of each of said blades, a pair of concentric rods extending into said drum and being vertically slidable but not rotative, a pair of vertically spaced horizontal disc-like cams mounted on said rods and engaging said arms for turning said blades to vary their pitch for producing a forward thrust when desired, and means for raising and lowering said rods relative to each other to turn said blades on their longitudinal axes or for raising and lowering said rods in unison to pivot said blades about transverse axes, said latter mentioned means comprising L-shaped members having one set of arms attached to said rods and another set of arms directed vertically upwards and threadedly engaging rotative bushings, and means for turning said bushings for moving said L-shaped members to similarly move said rods.

STEFAN APOSTOLESCU.